(No Model.)

W. HOPKINS.
CABLE RAILWAY.

No. 373,979. Patented Nov. 29, 1887.

Witnesses:
W. Rossiter
F. Mills.

Inventor
William Hopkins
By Quine Fisher
Atty's.

UNITED STATES PATENT OFFICE.

WILLIAM HOPKINS, OF DUBUQUE, IOWA, ASSIGNOR TO THE RASMUSEN CABLE COMPANY, OF CHICAGO, ILLINOIS.

CABLE RAILWAY.

SPECIFICATION forming part of Letters Patent No. 373,979, dated November 29, 1887.

Application filed May 2, 1887. Serial No. 236,821. (No model.)

*To all whom it may concern:*

Be it known that I, WILLIAM HOPKINS, of Dubuque, in the county of Dubuque, State of Iowa, have invented certain new and useful Improvements in Sprocket-Wheels, of which the following is hereby declared to be a full, clear, and exact description, sufficient to enable others skilled in the art to make and use the same.

My invention relates to sprocket-wheels applicable more particularly to cable railways of that class wherein the power to propel the car is derived from the moving cable through the medium of a sprocket-wheel attached to the car. As the wheel revolves, the fixed arms or teeth projecting therefrom move successively into the path of the rope, band, or chain, and engage with a series of stops, bars, buttons, or the like affixed to or forming part of the cable. The cable, with its stops or rests to engage with the sprocket-wheel, is practically a moving rack-bar flexible in character, and thus difficult to bring into and maintain in firm smooth mesh with the sprocket arms or teeth. Since the projecting arms or teeth have heretofore been radially fixed about the sprocket-wheel, it is plain that as the wheel revolves the arms or teeth must meet and pass away from the flexible rack-bar at an incline. The result is, that the stops, buttons, or the like, constituting the teeth of the flexible rack-bar, are pressed downward or pulled upward, tending to thus destroy the pitch-line and to prevent the rack and pinion from meshing properly.

The present invention is designed to obviate this difficulty; and it consists in providing a sprocket-wheel of improved construction, the arms or teeth of which move eccentrically about the axle supporting them, whereby said teeth or arms may enter and leave the flexible rack-bar and stand during engagement therewith substantially perpendicular to the line of the rack. If desired, the teeth, instead of engaging with the rack at a right angle to the line thereof, may be set at will to meet and leave the rack at any desired angle approximating a perpendicular which experience may demonstrate to be best.

The nature of the improvements will more fully appear from the following description, and will be thereafter defined in the claims at the conclusion thereof.

Figure 1:
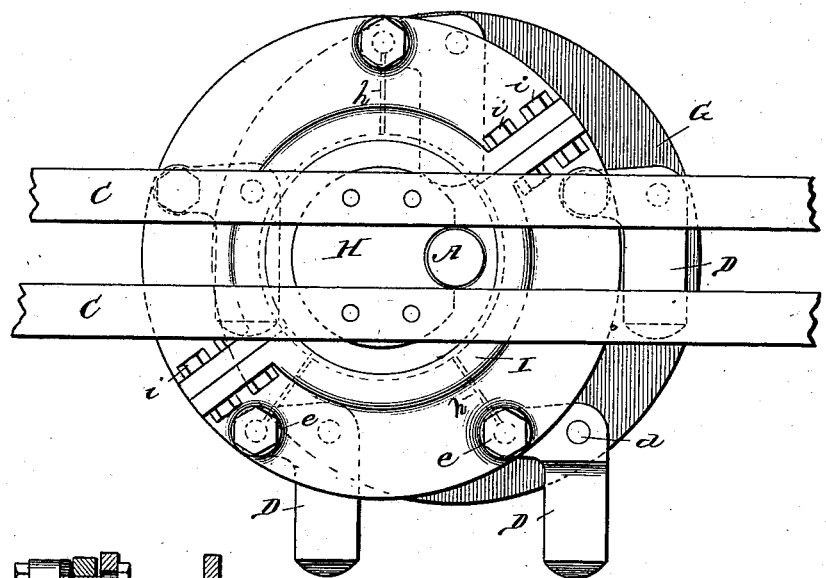
Figure 2:
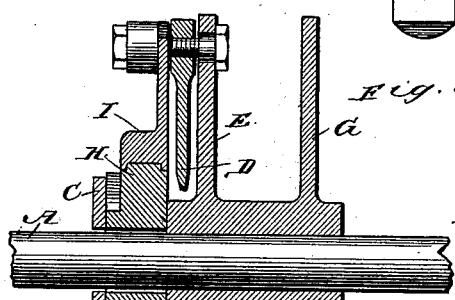
Figure 3:
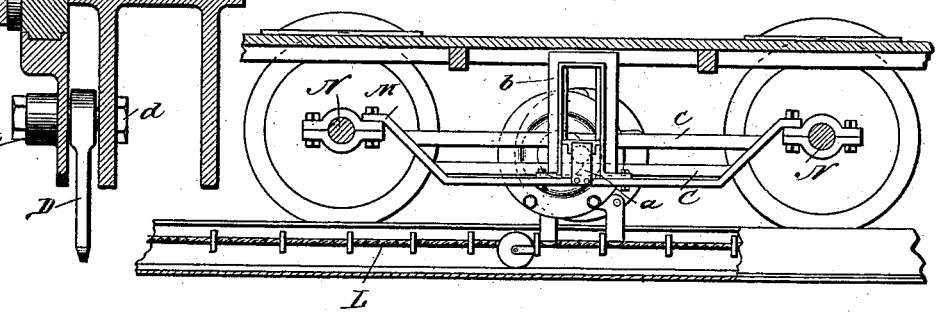

In the accompanying drawings, forming part of the specification, Figure 1 is a side elevation, and Fig. 2 a cross-section view, of a sprocket-wheel embodying my improvements. Fig. 3 is a view, in side elevation, showing the sprocket-wheel in position beneath the car-body and co-operating with the driving chain or cable.

Freely mounted upon the supporting axle A is the eccentric plate H, to which are rigidly secured, above and below the axle A, the supports or beams C, said beams extending thence to some fixed portion of the axle, sustaining-frame, or the like. The axle A may be mounted in journal-boxes $a$ of ordinary construction, permitting the axle to freely revolve therein, as shown in Fig. 3. Said boxes $a$, carrying the journal ends of the axle A, are freely set in upright ways or guides $b$, carried by the frame M. This frame is supported upon and between the axles N of the car, and furnishes a stout truss-like structure for the sprocket-wheel. It will be understood, however, that other kinds of sustaining-frame for the sprocket-wheel may be employed, and that the journal-boxes $a$, for the sprocket-wheel axle A, may be rigidly set and be otherwise varied in construction, as may be necessary in the particular use to which my improved sprocket-wheel is applied.

When the invention is employed in connection with cable railways, it is desirable that the axle and its sprocket-wheel be secured in some such form as that shown in the drawings, in order that these parts may be relieved from the irregular movements of the car-body. About the rim of the eccentric H is arranged the eccentric-strap I, the half-sections of which are bolted together at $i$, as shown. The inset joint at the contacting rims of the eccentric and eccentric-strap furnishes a guide for the latter in course of its revolution about the eccentric H, and serves also as well to exclude the dust from the bearing-surfaces of the rims. Oil-ducts $h$, (dotted lines,) fed from a convenient reservoir, serve to lubricate the contacting surfaces of the eccentric and eccentric-strap. Keyed firmly to the axle A at the side of the eccentric H and its strap is the disk E, carrying, preferably in piece therewith, the friction-wheel G, through the medium of which the movement of the sprocket-disk E may be controlled by brake-strap or clamp bearing thereon, as well understood. The sprocket-disk E is furnished with a series of engaging arms or teeth, D, bent, as shown, in elbow-like fashion, and pivoted loosely, as at $d$, to the sprocket-disk, and, as at $e$, to the eccentric-strap I. The arms D, being thus pivotally set with respect to the sprocket-disk E and to the eccentric-strap I, accommodate or readjust themselves during rotation in keeping with the eccentric relation of said strap and disk. To certainly effect this, the distance between the pivotal points $d\ e$ of the sprocket-arms is made equal to the distance between the true centers of the axle A and the eccentric plate H. It will also be seen that the line joining the pivot-points $d\ e$ of the sprocket-arms is substantially parallel with the line joining the true centers of the axle and the eccentric.

The eccentric H is arranged with respect to the axle A in such manner that the sprocket-arms D will project farthest beyond the rims of the eccentric-strap I and disk E during the time that said arms D are in engagement with the flexible rack or cable L. By such provision upon the upward turn or travel of the sprocket-arms D they come more and more within the rims of the sprocket-disk and eccentric-strap, thus clearing the floor of the car above and permitting the car-body to rest lower upon its running-gear. When the sprocket-arm D engages the moving cable or flexible rack L at the pitch-line thereof, which is the normal mesh-line of contact between the rack and sprocket-teeth, said arm is presented to the cable in a substantially perpendicular relation, owing to the eccentric arrangement of the arm in respect to the supporting-axle A. Upon meshing with the moving cable or flexible rack the sprocket-arm D is shifted thereby, thus imparting a rotary movement to the sprocket-disk E and to the axle A, secured thereto. This rotary movement causes each of the sprocket-arms to be presented in turn to the flexible rack, the successive arms meshing and releasing from the rack in right or perpendicular line, thus insuring an even and practically unyielding connection for the time being between the flexible rack-bar or cable and the sprocket-arms. Each sprocket-arm D being secured pivotally to the eccentric-strap I, as well as to the disk E, it is plain that the eccentric-strap is forced to partake of the rotary movement of the sprocket-disk, and in consequence to pass around the eccentric H, thus shifting the position of the sprocket-arms D in their relation to the sustaining-axle A. It is this eccentric shift of the sprocket arms or teeth in respect to the sustaining-axle which causes said arms successively during rotation in contact with the flexible rack-bar to present themselves rigidly perpendicular at the pitch-line of meshing engagement, and so to continue during the period of contact with said rack-bar and until the teeth have cleared from the same. Notwithstanding the sag or swaying movement of the flexible rack, the right-line engagement of the sprocket-teeth therewith, due to the eccentric relation and shift of these latter about their supporting-axle, enables the teeth to be firmly and rigidly held in mesh with the rack and secures evenness and regularity of operation without sway, slip, or strain.

Since the pivotal points $d\ e$ of the sprocket-arms are determined with reference to the true centers of the axle and eccentric, respectively, it is manifest that said points will constantly readjust themselves during the rotary movement in accordance with the readjustment of the sprocket-disk E and the eccentric-strap I with respect to the axle A and the eccentric H. By varying the position of the true centers of the eccentric H and of the axle A, and correspondingly changing the line of the pivotal connections $d\ e$ in relation parallel thereto, the sprocket-arms D may be made to assume any desired angle other than a right angle to the moving rack-bar as they engage with and leave the same.

The invention is not restricted in benefit to the particular use described in connection with cable railways, but may be employed also in other relations where it is necessary to engage a sprocket-wheel with a flexible or unsteady rack-bar, which renders the pitch-line of contact unstable or shifting.

Without limiting myself to the precise details of construction hereinbefore set forth, and having thus described my invention, what I claim is—

1. A sprocket-wheel the arms or teeth of which at their pitch-line are arranged eccentrically in relation to the supporting-axle, substantially as described.

2. In cable railways, the combination, with the supporting-axle, of the eccentrically-set sprocket arms or teeth mounted thereon and revolving therewith and the moving cable engaging with said arms or teeth, substantially as described.

3. The combination, with the axle and with the eccentric mounted loosely thereon, of the strap secured to said eccentric, the sprocket-disk fixed to the axle, and the sprocket-arms secured pivotally to the sprocket-disk and the eccentric-strap, respectively, substantially as described.

4. The combination, with a cable or rack-bar, of a sprocket-wheel engaging therewith, the arms or teeth of said wheel at their pitch-line being arranged eccentrically in relation to the supporting-axle, substantially as described.

5. In cable railways, the combination, with the supporting-axle, of the eccentrically-arranged sprocket arms or teeth mounted thereon, substantially as described.

Witnesses:    WILLIAM HOPKINS.

F. W. KINGMAN,
G. WOOD BINNING.